(12) United States Patent
Lu et al.

(10) Patent No.: US 8,725,353 B2
(45) Date of Patent: May 13, 2014

(54) VEHICLE ROLLOVER MITIGATION SYSTEM

(75) Inventors: Jianbo Lu, Livonia, MI (US); Dimitar Petrov Filev, Novi, MI (US); Greg Blaisdell Stevens, Ann Arbor, MI (US); Jeffrey Dan Rupp, Ann Arbor, MI (US); Douglas Scott Rhode, Farmington Hills, MI (US); Thomas Edward Pilutti, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 187 days.

(21) Appl. No.: 13/350,839

(22) Filed: Jan. 16, 2012

(65) Prior Publication Data
US 2013/0184936 A1  Jul. 18, 2013

(51) Int. Cl.
*A01B 69/00* (2006.01)
*G06F 7/70* (2006.01)
*B60W 30/04* (2006.01)
*B60T 8/1755* (2006.01)

(52) U.S. Cl.
CPC ............ *B60W 30/04* (2013.01); *B60T 2230/03* (2013.01); *B60T 8/17554* (2013.01); *B60T 2230/06* (2013.01)
USPC .............................................. 701/41; 701/70

(58) Field of Classification Search
CPC ...................................................... B60W 30/04
USPC ............................... 701/38, 41, 70; 280/5.506
See application file for complete search history.

(56) References Cited

U.S. PATENT DOCUMENTS

| | | | | |
|---|---|---|---|---|
| 5,869,943 A | * | 2/1999 | Nakashima et al. | 318/586 |
| 2005/0131604 A1 | * | 6/2005 | Lu | 701/38 |
| 2010/0017070 A1 | * | 1/2010 | Doering et al. | 701/48 |

* cited by examiner

*Primary Examiner* — Helal A Algahaim
*Assistant Examiner* — Nga X Nguyen
(74) *Attorney, Agent, or Firm* — Joseph E. Root

(57) ABSTRACT

The present disclosure provides a system and a method for mitigating vehicle rollovers, the method comprises monitoring a vehicular tilt and sensing a vehicular rollover in a particular direction, through a tilt sensor. Further, the system determines an occurrence of a rollover according to a calculated tilt threshold, through a central processing unit. Steering the vehicle in the sensed direction of the rollover, accelerating the vehicle in the same direction, and braking the vehicle upon sensing a decrease in the rollover, all being controlled through a controller, enables the vehicle to eventually stabilize and return to track.

16 Claims, 4 Drawing Sheets

VEHICLE ROLLOVER MITIGATION SYSTEM

BACKGROUND

This application generally relates to the field of vehicular rollover mitigation systems and, more particularly, towards systems that mitigate a soft-tripped vehicular rollover through a systematic and electronic control of certain in-vehicle systems.

Vehicular rollovers have been observed in motor sports, racing events, off-road driving, or aggressive on-road driving. Rollover protection and mitigation systems have thus been developed and applied over time to protect vehicles and its occupants from injuries. Some protection systems are purely structural, while other solutions provide for electronically controlled rollover prevention measures. More so, such rollover protection systems have been applied in commercial vehicles as well.

When a vehicle slides sideways to strike an immovable obstacle, such as a curb or a stationary vehicle, the tires and/or the vehicle body undergoes a very high impact force from the lateral direction. Such lateral impact forces could cause the vehicle to rollover and the corresponding rollovers are called hard tripped rollovers. On the other hand, rollovers occurring without the involvement of high lateral impact forces, or with small lateral tripping forces, result in soft-tripped rollovers. Soft-tripped rollovers could happen when the vehicle slides sideways digging its tires into soft soil, when one side of the vehicle rides up on an object, or when one side of the vehicle rides down to a drop-off. Other rollovers resulting from vehicle imbalance caused while negotiating a turn, or while steering hard in a direction etc., may be classified as untripped rollovers. In conventional vehicles, electronic control systems, such as roll stability controls, are observed to be effective in mitigating untripped rollovers. The majority of rollovers, however, are tripped rollovers (including both hard and soft-tripped rollovers), and in such conventional systems, tripped rollovers limit the functionality of the roll stability control systems. More particularly, roll stability control systems function to reduce a risk of rollover caused by a driver's aggressive steering maneuver by braking heavily on certain wheel/wheels when a tilt of the body, beyond a predetermined threshold, is sensed together with a measured steering aggression. Such roll stability control systems have limited effectiveness in mitigating tripped rollovers that are not necessarily dependent on the driver's steering aggression.

While undertaking a maneuver, some systems alert a vehicle driver of the possibility of a rollover. Such systems however, depend on the driver's ability to control and stabilize the vehicle, before a rollover occurs. In such cases, the likelihood of a rollover and its consequences relies on the driver's efforts and the driver's ability to act timely, which may vary over time. Further, driver inaction due to factors such as fatigue, distraction or even panic may compromise the effectiveness of such rollover alerting mechanisms.

It would thus be desirable to have a vehicular rollover mitigation system that assists the driver in undertaking any responsive measures upon a rollover and in maintaining complete attention on the track ahead.

SUMMARY

One embodiment of the present disclosure describes a method for mitigating vehicle rollovers. The method comprises monitoring a vehicular tilt and sensing a vehicular rollover in a direction, through a tilt sensor. Further, determining an occurrence of a rollover according to a calculated tilt threshold is performed through a central processing unit, the central processing unit being disposed within a controller. Steering the vehicle in the sensed direction of the rollover, accelerating the vehicle by varying a throttle position in the same direction, and braking the vehicle upon sensing a decrease in the rollover, eventually stabilizes the vehicle. The steering, throttle and brakes are all controlled through the controller.

Another embodiment of the present application describes a system for mitigating vehicle rollovers. The system includes a vehicle, a tilt sensor, a vehicle accelerator, a vehicle brake, a vehicle steering system. The tilt sensor is mounted on the vehicle for monitoring the vehicle's tilt relative to horizontal, and to sense a vehicle rollover in a particular direction. A controller is connected to the tilt sensor, the vehicle brake, the vehicle accelerator, and the vehicle steering system. During a sensed rollover, the controller is configured to steer the vehicle in the direction of the rollover, accelerate the vehicle with the steering being maintained in the same direction, and brake the vehicle upon sensing a decrease in the rollover.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

Overview

In general, the present disclosure describes a soft tripped rollover mitigation system, which responds in accordance with a vehicle tilting beyond a calculated threshold. To this end, the system employs a tilt sensor that monitors and detects a vehicle tilt during a maneuver. Upon determining a tilt and a possible rollover, a controller connected to the tilt sensor electronically and sequentially controls certain vehicle inputs, such as the vehicle steering for directing the vehicle, throttle control for providing variations in vehicle acceleration, and vehicle brakes for stopping and eventually stabilizing the vehicle.

Exemplary Embodiments

Figure 1:
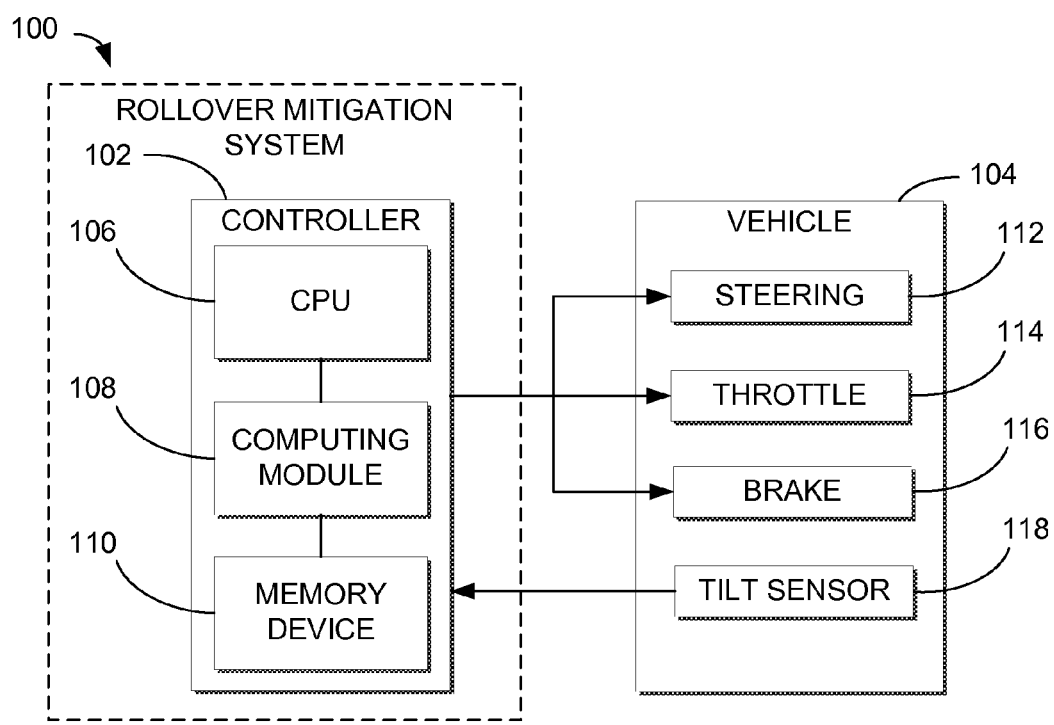
FIG. 1 is a schematic of an exemplary vehicle rollover mitigation system according to the present disclosure.

FIG. 1 illustrates an exemplary rollover mitigation system 100 installed in a vehicle 104. The system 100 includes a controller 102 that comprises a central processing unit (CPU) 106, a computing module 108, and a memory device 110. The controller 102 is connected to a tilt sensor 118, and constantly retrieves vehicular tilt information, and is also connected to a vehicle steering 112, a vehicle accelerator or a vehicle throttle 114, and a vehicle brake 116. Connections, such as noted above, provide for a constant communication mode for the controller 102 to control the steering 112, throttle 114 and the brake 116 of the vehicle 104 in accordance with a sensed condition, as described further below.

The controller 102 is a microprocessor based device, and includes the CPU 106 enabled to process the incoming information from the tilt sensor 118, a RAM and/or ROM that functions as a volatile memory unit, along with associated input and output buses. The controller 102 may be configured as an application specific integrated circuit, or may be formed through other logic devices that are well known in the art. More particularly, the controller 102 either may form a portion of one of the vehicle's electronic control unit (ECU) module, such as a safety ECU module, a vehicle dynamics ECU module, a restrain control module, or may be alternatively configured as a stand-alone ECU. For functionality and service, the controller 102 can be configured within a vehicle dashboard, a vehicular panel, or any other portion within the vehicle 104, from where the system 100 may remain accessible to a user.

The tilt sensor 118 is mounted on the vehicle 104 for monitoring the vehicle's tilt relative to horizontal and sensing a vehicle rollover in a direction. More particularly, the tilt sensor 118 is in the form of a dual-axial sensor, such as a dual-axial accelerometer that constantly monitors and determines a vehicle tilt. The output signals of such accelerometers are analog voltages fed to the CPU 106 disposed within the controller 102. The CPU 106 thus, through the tilt sensor 118, functions to sense and determine not just the value of the vehicle tilt, but also the direction of a possible vehicular rollover.

Alternatively, a combination of inertial sensors, or a software sensor might replace the functionality of tilt sensor 118, where the tilt indication is estimated through algorithms using on-board sensors such as roll rate, yaw rate, and the other acceleration sensors.

In another embodiment of the present disclosure, the functionality of the tilt sensor 118 may be replaced with an existing in vehicle rollover curtain activation flag. Such an activation flag may act as a tilt threshold (described later), activating and deploying the rollover mitigation system 100. In addition, the computed and measured signals such as roll angle, longitudinal velocity, longitudinal slip ratios, brake pressure, engine torque, etc., may also form inputs for the rollover mitigation system 100.

Certain environmental sensors may also replace the tilt sensor 118 for determining the tilt information of the vehicle 104. Such environmental sensors may function to determine the tilt in the vehicle 104 in relation to horizontal, but otherwise remain similar in functionality as discussed in connection with the tilt sensor 118.

As noted above, the CPU 106, housed within the controller 102, may structurally be of a known type in the art, and may accordingly be a microprocessor based unit, functioning as rollover calculator and may determine an occurrence of a rollover. Such determinations may be performed through a system logic configured within the CPU 106. Accordingly, the CPU 106 may be configured to first receive the incoming signals from the tilt sensor 118 as analog voltages, process it, and thus determine the occurrence of a rollover. Once certain signals ascertain a vehicular rollover, the CPU 106 may process such signals to determine an effective angular roll of the vehicle 104. The angular roll of the vehicle 104 may depend on the factor of the magnitude of acceleration acting upon the center of mass of the vehicle 104, in the direction of the roll 'A' (shown in FIG. 2), and may be determined through the CPU 106. The angular roll may be established as the angle calculated between a virtual axis, perpendicular to the vehicle floor and passing through the center of mass of the vehicle 104, deviating from a vertical axis perpendicular to the ground and passing through the same center of mass.

For the above noted cause, a tilt threshold value, understood as the minimum angular tilt value, at a certain vehicular velocity, sufficient to cause a rollover, may be established. The tilt threshold value of a particular rollover, primary depending upon 2 factors, firstly, the vehicle's center of mass, and secondly, the vehicle's instantaneous velocity, may differ from condition to condition. For instance, during a possible soft-tripped condition, a vehicle travelling at a lower velocity would remain more stable and might have a lower chance of rollover than a vehicle travelling at a higher velocity. The instantaneous vehicular velocity varying from condition to condition may thus cause the tilt threshold value also to vary from condition to condition. As a result, a tilt threshold value is calculated, through the CPU, 106 for every possible vehicle rollover.

The CPU 106 may thus be configured to compare the effective angular roll to the calculated tilt threshold value to determine an occurrence of rollover, and whether a potential or immediate rollover condition exists, and feeds the result to the controller 102.

Forming an integral part of the controller 102, the computing module 108 is similar to the CPU 106 in structure, and comprises of one or more processors for carrying out certain tasks. Such tasks may be to extract vehicular velocity and acceleration related information via a speed data sensor (not shown) connected to a vehicular speedometer. Delivery of such information to the computing module 108 may be performed through wire harness linked to the speed data sensor.

Certain aspects of a vehicle rollover determined through the computing module 108, configured within the controller 102, are for example, the nature of a rollover. Soft-tripped rollovers can be determined and differentiated from hard trips by monitoring the vehicle's lateral acceleration, with such monitoring being carried out through the accelerometers mounted on the vehicle. If the magnitude of the lateral acceleration is below a certain threshold right before a large roll angle or roll rate buildup, or before the activation of a rollover curtain, the nature of the rollover is determined as soft-tripped by the computing module 108. Otherwise, the rollover may be classified as a hard tripped or an untripped rollover. During sensed hard tripped or untripped conditions, the system 100 may not be able to assist in providing protection and mitigation from a rollover, and accordingly may remain deactivated.

A severity value of a rollover is established according to the sensed vehicular velocity before the vehicle 104 crosses the tilt threshold or just at an occurrence of a rollover. Being directly proportional to the vehicle's velocity, and related to the tilt threshold value, the severity value of a rollover once determined, may form optimal and intelligent inputs. Such inputs may provide instructions to the steering 112 to turn a certain amount, the throttle 114 to vary in position and release a certain quantity of fuel to accelerate the vehicle 104, and the brake 116 to apply a certain pressure rate to halt and eventually stabilize the vehicle 104.

The memory device 110, disposed within the controller 102, may be a non-volatile storage medium that stores information related to the overall functioning of the rollover mitigation system 100. The memory device 110 may thus include vehicle information such as vehicle weight, size, height, shape, center of mass, calculated tilt threshold values, rollover calculation methodologies, vehicle's specific characteristics, etc., that require implementation during a sensed vehicle rollover.

Other components in the system 100, namely the steering 112, the throttle 114, and the brake 116, being electronically controlled through the controller 102, are well known in the art, and thus have not been discussed in the present disclosure.

The sequence of figures depicted in FIGS. 2A, 2B, 2C, and 2D, illustrate an exemplary prior art methodology to overcome a soft-tripped rollover in a vehicle 250.

Figure 2A:
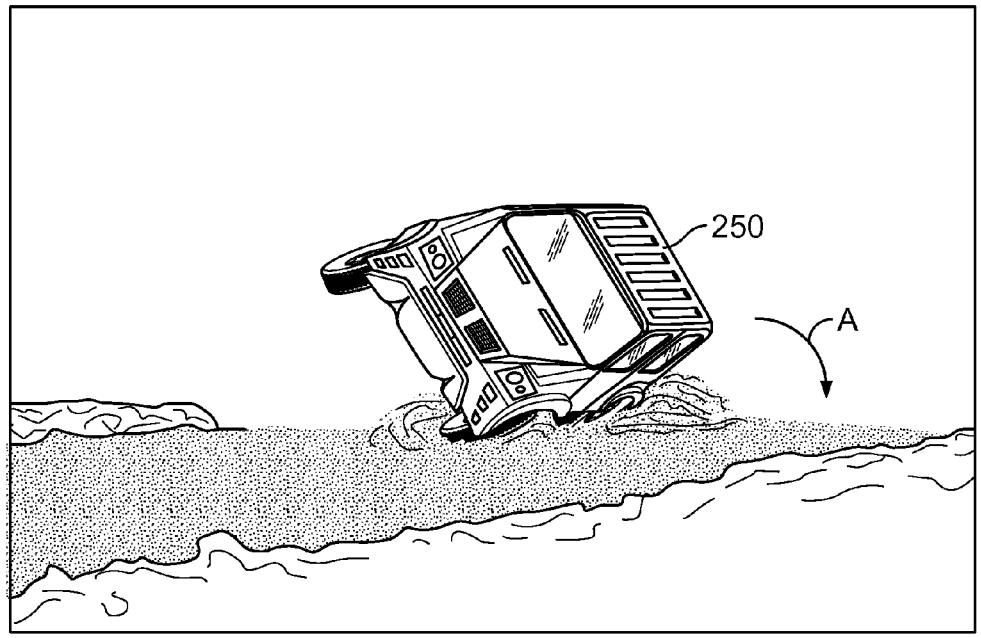
FIG. 2A illustrates an exemplary prior art sequence of operation of a vehicle undergoing a rollover.

Accordingly, FIG. 2A depicts the vehicle 250 undergoing a soft-tripped rollover, as shown. Such a rollover in a direction A, urges a driver of the vehicle 250 to initiate responsive measures to overcome the caused instability.

Figure 2B:
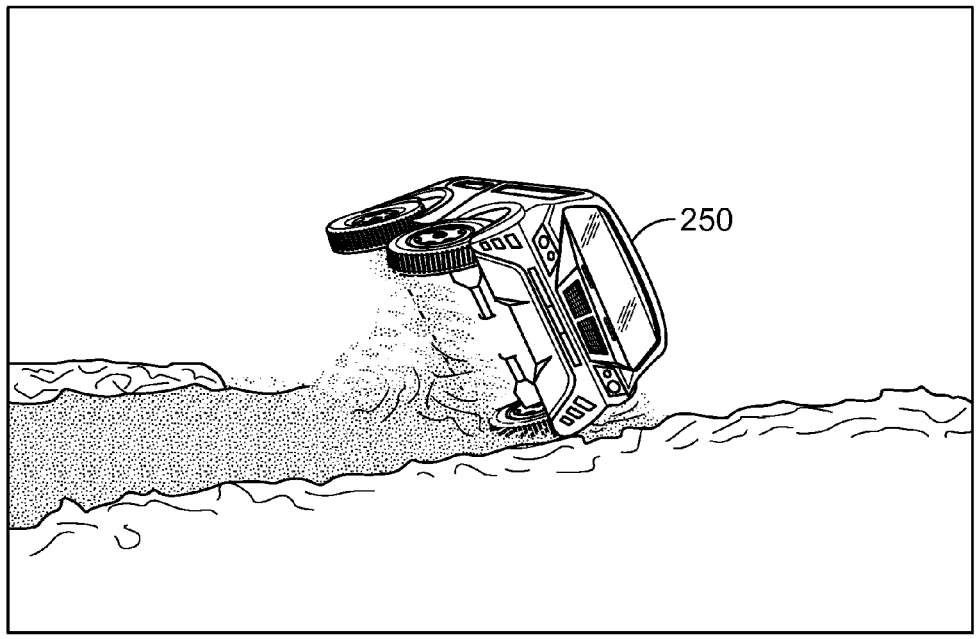
FIG. 2B illustrates an exemplary prior art sequence of operation of the vehicle steering in a rollover direction.

As part of the responsive measures, in FIG. 2B, the driver may steer the vehicle 250, via the steering 112, in the direction A, to counter the rollover, aiming to stabilize the vehicle 250 and bring all its wheels to contact with an underlying ground surface.

Figure 2C:
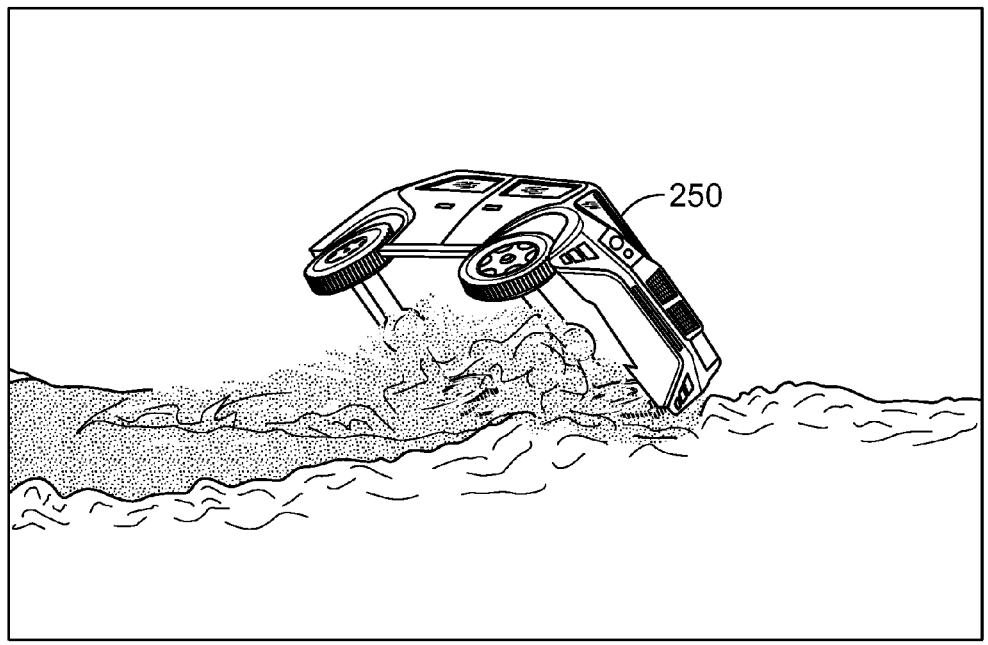
FIG. 2C illustrates an exemplary prior art sequence of operation of the vehicle accelerating in the direction of the rollover.
Figure 2D:
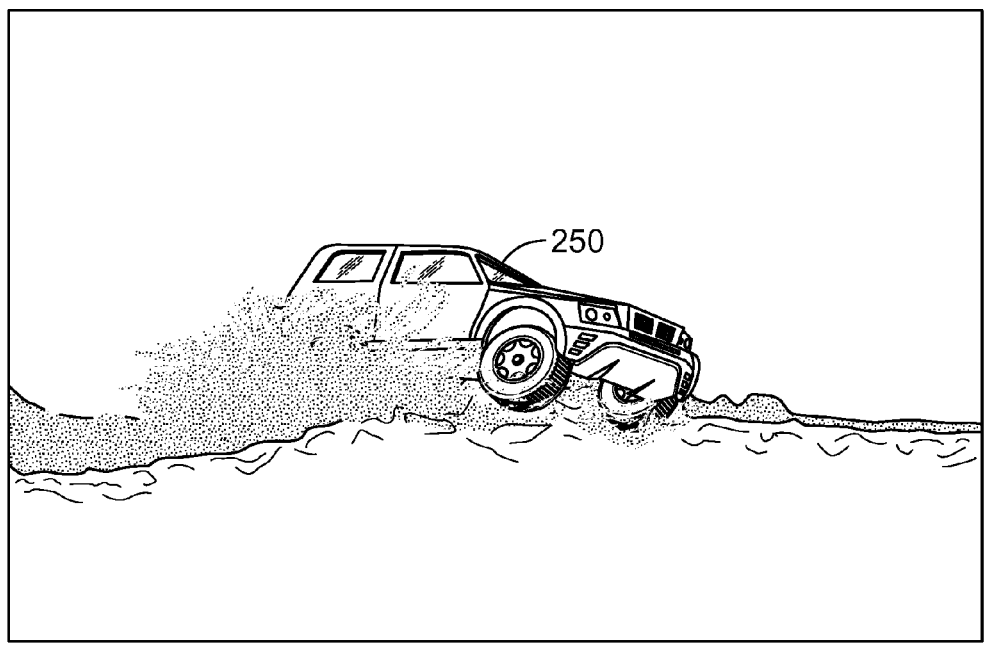
FIG. 2D illustrates an exemplary prior art sequence of operation of the vehicle overcoming the rollover by stabilizing and braking.

Failing to perform so through the steering 112, in FIG. 2C, the driver may subsequently depress the throttle 114, releasing sudden and excessive quantities of fuel into the vehicle's combustion chamber. Such a response aims to accelerate the vehicle 250 and introduce certain load transfer to the rear of the vehicle 250, and at the same time collapses the lateral tire force of the wheel to recover from the unstable rolling condition.

When such measures eventually stabilize the vehicle 250, the driver may apply the brake 116 in order to bring the vehicle 250 to a complete halt. Accordingly, such stabilization is depicted in the FIG. 2D. Once halted, the vehicle 250 may be driven further according to the driver's discretion.

Figure 3:
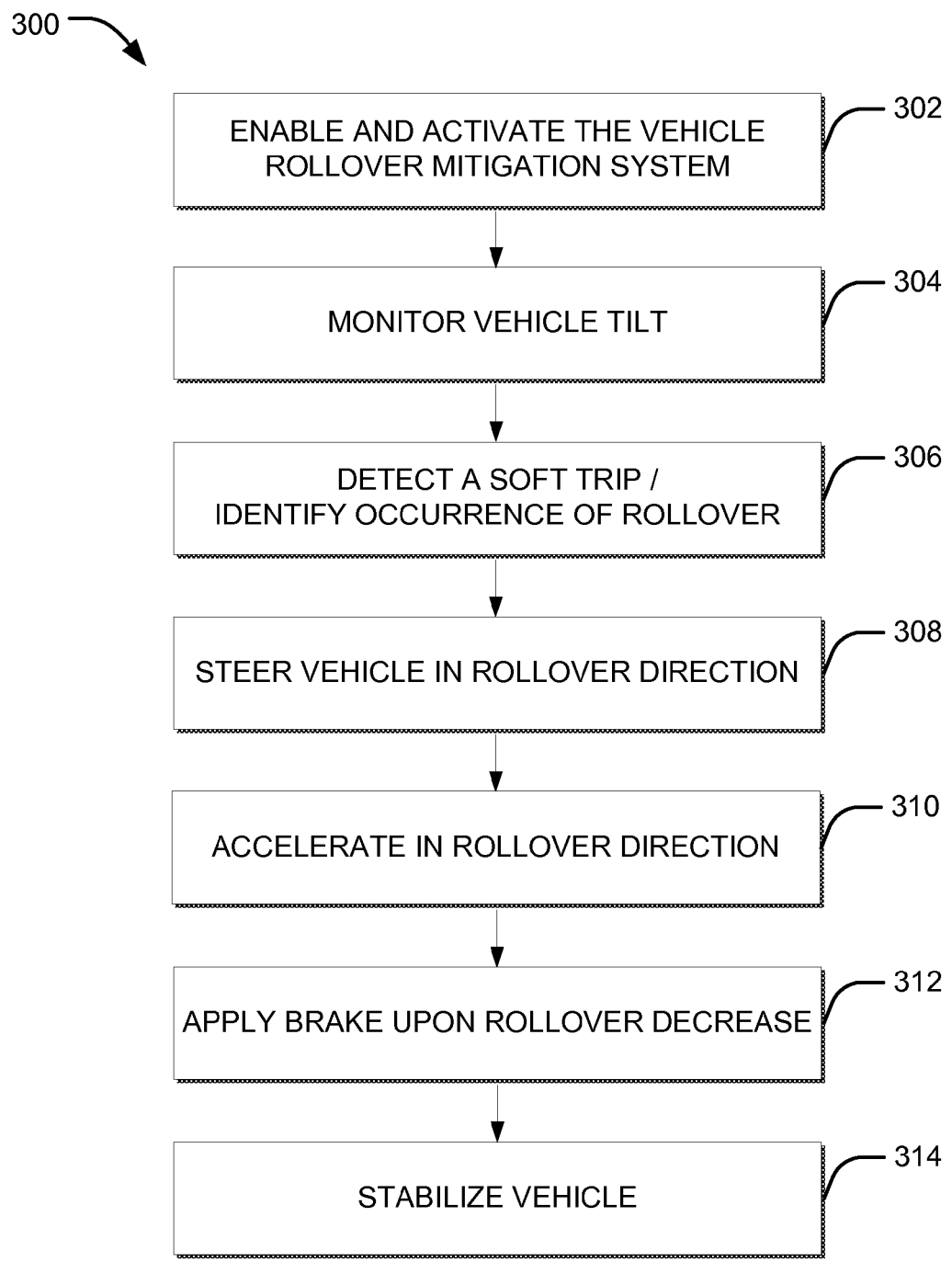
FIG. 3 is a flowchart depicting an exemplary method of operation of the rollover mitigation system.

With the vehicle 250 equipped with the rollover mitigation system 100, if the driver successfully brings the vehicle 250 to a stable condition, avoiding a rollover, the rollover mitigation system 100 would remain de-activated. On the other hand, if the driver does not provide enough effort to stabilize the vehicle 250 or the driver panics and worsens the rollover trending, the rollover mitigation system 100 will be activated to mitigate the rollover. The methodology of the present disclosure is described through a flowchart in FIG. 3. The method is a combination of the system 100, discussed in connection with FIG. 1, and the measures of the prior art, discussed in connection with the sequence of figures in FIGS. 2A, 2B, 2C, and 2D. Accordingly, FIG. 3 depicts an exemplary method 300 of the system 100, and the description of the flow of operation is thus as follows.

At stage 302, conveniently positioned interfaces, such as switching mechanisms, touchscreens, knobs, levers etc., within vehicular confines, may enable the rollover mitigation system 100. More particularly, such interfaces could be positioned on a vehicle dashboard, a vehicle panel, or in a manner that the system 100 may remain operationally accessible to a user at all times. Alternatively, the system 100 may also be configured to be automatically enabled at the start of operation of the vehicle 104. Upon detecting soft-trip rollover situations, the method 300 activates the enabled rollover mitigation system 100.

At the stage 304, the tilt sensor 118 monitors a tilt in the vehicle 104, during a maneuver, the tilt being observed in relation to the horizontal. With the velocity of the vehicle 104 being constantly sensed through a speed data sensor connected to a vehicle speedometer or a speed estimation calculated using an on-board sensor in a control module such as a brake control module, and the tilt sensor 118 functioning to determine the direction of rollover, the possibility of rollover is thus diagnosed. Such diagnosis may be processed through a rollover calculator such as the CPU 106, by retrieving calculation methodologies from the memory device 110.

In another embodiment of the present disclosure, the rollover mitigation system 100 may be activated based on a detected roll angle and rate, or upon an activation flag of a rollover curtain, as noted above. In such an arrangement, the functionality of the tilt sensor 118 might not be a separated hardware rather than a software sensor that obtains its value through computations based on on-board sensor such as the roll rate, the yaw rate, the lateral acceleration, the longitudinal acceleration, etc.

The CPU 106 establishes a tilt threshold value at stage 306 upon the occurrence of a possible rollover. Such an establishment is determined by monitoring the instantaneous vehicle velocity, as noted above, and extracting data related to the center of mass of the vehicle 104 from the memory device 110. Correspondingly, the rollover may be detected as a soft trip according to an observed change in the vehicle's lateral acceleration together with large vehicle roll angle. At the completion of this stage 306, with the calculation of a tilt threshold value, and its comparison to an effective roll angle of the vehicle 104, the rollover diagnosis is complete. The identification of the roll angle to be of a greater value than the calculated tilt threshold value enables the controller 102 to take sequence of control actions using available control of the steering 112, throttle 114, and the brake 116 in a timely manner.

Accordingly, in the subsequent stage 308, the controller 102 takes control action using steering 112, and first steers the vehicle 104 in the sensed direction of the rollover, the direction being sensed through the tilt sensor 118, and the controller 102 functioning according to an input received from the tilt sensor 118. As noted before, the correct amount of steering required may be determined through the computing module 108. Steering 112 might be an electronic power steering assist system (EPAS), an active front steering system (AFS), or a combination of an EPAS and an AFS.

In case the vehicle 104 is observed to tilt further after the initial steering control, controller 102 will initiate control action using throttle 114, which is thus adapted to release fuel in sudden and excessive quantities to accelerate the vehicle 104 with the steering 112 being maintained in the direction of the rollover, aiming to eventually stabilize the vehicle 104. Such a functionality is provided through the controller 102 as well, at the stage 310. In addition, the controller 102 provides traction to the wheels that are on the ground surface when at least one of the wheels is detected to have a large slip ratio during a rollover. Accordingly, If the lifted wheels have a large slip ratio, torque-vectoring using either braking or limited slip differentials (LSD) or Electronic limited slip differentials (eLSD) is used on the lifted wheels to allow the corresponding wheels on the ground surface to generate tractive force.

Once the vehicle 104 starts stabilizing upon a sensed decrease in the rollover, after the vehicle's throttle action, the controller 102 may ease out throttle 114 to halt excessive fuel release, and may subsequently apply the brake 116. In accordance, such braking may be applied at the stage 312 to achieve a resultant and complete vehicular stabilization at the subsequent stage 314. At the completion of stage 314, the brake 116 is released, the vehicle 104 is stabilized, and the controller 102 returns the steering 112 to the original position, and restores the control of the steering 112, throttle 114, and the brake 116 to the driver, enabling the vehicle 104 to be driven further according to the driver's discretion. The controller 102 thus returns the vehicle 104 to normal operation once the brake 116 is applied, and upon sensing a predetermined amount of decrease in the vehicle tilt, the decrease being established according to the calculated tilt threshold.

In an alternate embodiment of the present disclosure, the tilt threshold may be maintained constant at an average value throughout all situations of rollovers. Such a provision, being imprecise in nature, may however result in lightweight and simpler systems.

The specification has set out a number of specific exemplary embodiments, but those skilled in the art will understand that variations in these embodiments will naturally occur in the course of embodying the subject matter of the disclosure in specific implementations and environments. It will further be understood that such variations and others as well, fall within the scope of the disclosure. Neither those possible variations nor the specific examples set above are set out to limit the scope of the disclosure. Rather, the scope of claimed invention is defined solely by the claims set out below.

We claim:

1. A method for mitigating vehicle rollovers, the method comprising:
    monitoring a vehicle tilt and sensing a vehicle rollover in a direction, through a tilt sensor;
    determining an occurrence of a rollover according to a calculated tilt threshold through a central processing unit disposed within a controller;
    steering the vehicle in the sensed direction of the rollover, the steering being controlled through the controller;
    accelerating the vehicle, in the direction of the rollover after steering control, by varying a throttle position with the steering, the throttle being controlled by the controller; and
    braking the vehicle through a brake upon sensing a decrease in the rollover, the brake being controlled through the controller.

2. The method of claim 1 further determining a nature of the rollover to be soft-tripped using a computing module configured within the controller.

3. The method of claim 1 further establishing a severity value of the rollover according to a vehicular velocity sensed before the vehicle crosses the tilt threshold, the velocity being sensed through one of the following:
    a speed data sensor connected to a vehicle speedometer; and
    an on-board sensor.

4. The method of claim 3, wherein the tilt sensor is one of the following:
    a dual-axial accelerometer;
    a combination of inertial sensors; and
    a software sensor, that obtains the vehicle tilt indications through estimations from the on-board sensor.

5. The method of claim 1, wherein the controller returns the vehicle to normal operation once the brake is applied, and upon sensing a predetermined decrease in the vehicle tilt, the decrease being established according to the calculated tilt threshold.

6. The method of claim 1, wherein the acceleration includes providing traction to the vehicle's wheels in contact with a ground surface.

7. The method of claim 6, wherein torque-vectoring will be used on a lifted wheel with large slip ratio, to allow the wheels on the ground surface to generate tractive force, using one of the following:
    braking;
    limited slip differentials; and
    electronic limited slip differentials.

8. The method of claim 6, wherein the traction is provided through the controller.

9. A system for mitigating vehicle rollovers, the system comprising:
    a vehicle,
    a tilt sensor mounted on the vehicle, configured to monitor the vehicle's tilt relative to horizontal and to sense the direction of tilt as a rollover direction;
    a vehicle accelerator, configured as a vehicle's throttle,
    a vehicle brake,
    a vehicle steering; and
    a controller connected to the tilt sensor, the vehicle brake, the vehicle accelerator, and the vehicle steering, configured to
        steer the vehicle in the rollover direction, and accelerate the vehicle in the direction of the rollover after steering control, and
        brake the vehicle upon sensing a decrease in the rollover after the vehicle's throttle action.

10. The system of claim 9, wherein a computing module configured within the controller determines a nature of a rollover to be soft-tripped.

11. The system of claim 9, wherein a severity value of the rollover is established according to a vehicular velocity sensed before the vehicle crosses a tilt threshold, the velocity being sensed through at least one of:
    a speed data sensor connected to a vehicle speedometer; and
    an on-board sensor.

12. The system of claim 11, wherein the tilt sensor is one of:
    a dual-axial accelerometer;
    a combination of inertial sensors; and
    a software sensor, that obtains the vehicle tilt through estimations from the on-board sensor.

13. The system of claim 9, wherein the controller includes a central processing unit that determines an occurrence of the rollover according to a calculated tilt threshold.

14. The system of claim 13, wherein the controller returns the vehicle to normal operation once the brake is applied, and upon sensing a predetermined amount of decrease in the vehicle tilt, the decrease being established according to the calculated tilt threshold.

15. The system of claim 9, wherein traction is provided to vehicle wheels that are on a ground surface, when at least one of the wheels is detected to have a large slip ratio during the rollover.

16. The system of claim 15, wherein the traction is provided through the controller.

* * * * *